United States Patent Office 2,985,520
Patented May 23, 1961

2,985,520
METHOD FOR PREPARATION OF MONO-
CRYSTALLINE MATERIAL

Leon Merker, Bronx, N.Y., assignor to National Lead Company, New York, N.Y., a corporation of New Jersey No Drawing. Filed Aug. 11, 1958, Ser. No. 754,145

3 Claims. (Cl. 23—301)

This invention relates to monocrystalline calcium titanate and to its method of preparation.

Calcium titanate is a fairly rare compound but it is found in a variety of limited areas throughout the world. Natural calcium titanate is found as black, orthorhombic and highly twinned crystals. Because of its highly twinned formation, its crystal structure is very complex. It would be desirable to produce an untwinned calcium titanate crystal because it possesses a high index of refraction and a low reciprocal dispersion.

An object of the instant invention is to provide a process for producing monocrystalline calcium titanate which possesses a high index of refraction and a low reciprocal dispersion of $v$ value. A further object is to provide a method for producing monocrystalline calcium titanate free from twins which is clear and transparent. A still further object is to provide a process for producing single crystal calcium titanate which can be cut and polished to form useful articles of commerce such as gems, lenses, prisms and the like.

These and other objects will become apparent from the following more complete description of the instant invention.

Broadly, this invention contemplates a method for the preparation of monocrystalline calcium titanate which comprises fusing powdered calcium titanate in an oxyhydrogen flame, crystallizing the molten material to form a monocrystalline mass of calcium titanate in the form of a boule, said boule formed at a temperature from 1850° C. to 1950° C. and without allowing the boule to cool to a temperature below 1400° C., heat treating said boule in an oxidizing atmosphere at a temperature from 1400° C. to 1600° C. for 10 hours to 48 hours to anneal said boule and further heat treating the annealed boule at a temperature from 1650° C. to 1800° C. for 5 hours to 10 hours to detwin said boule and cooling said moule at a rate lower than 60° C. per hour at temperatures above 1000° C. to prevent twins from reappearing in said boule.

The term calcium titanate is intended to embrace both pure $CaTiO_3$ and $CaTiO_3$ which contains impurities or added coloring or modifying agents either present or added which are of a nature and in amount so as to not affect the monocrystalline structure nor alter the desired color of the calcium titanate material produced. In most cases the impurities are held to a minimum and ordinarily will not exceed a few tenths of a percent and modifying or coloring agents are added in the amount necessary to produce the desired effect.

In forming the boule it has been found that the temperature of the flame should be maintained somewhat above the melting point of the calcium titanate feed material, but should not exceed a temperature where the molten material tends to flow over the edges of the pool at the top of the boule. The flame temperature may be maintained by adjusting the quantity and rates of flow of both the hydrogen and oxygen gases but it is important that the flame be kept as constant and quiet as possible.

The preferred type of apparatus used in the instant invention is similar in design and construction to that shown in U.S. Patent No. 2,792,287, issued May 14, 1957, to Charles H. Moore, Jr., et al. and in Belgian Patent No. 491,522. In such an apparatus the powdered calcium titanate is fed into the center tube of a three concentric component burner along with a portion of the oxygen and the powdered material falls onto a pedestal upon which the boule is grown. The other concentric tubes are used to introduce the remainder of the oxygen and hydrogen which make up the flame. It has been found desirable to introduce the remainder of the oxygen through the intermediate tube and the hydrogen through the outermost tube.

In preparing the boule it is preferred to employ calcium titanate in finely powdered form. The calcium titanate starting material should be substantially free from objectionable or incompatible impurities which detrimentally affect the crystal structure or the color or other properties of the crystal. Starting material should be finely divided and fairly uniform in size. For most efficient results, the calcium titanate starting material should possess an open structure with units capable of being rapidly melted. A calcium titanate starting material having an ultimate unit particle size of less than 1 micron has proved especially satisfactory. Aggregates of these small particles greater than 100 mesh should also be avoided as they do not tend to melt completely. The feed material should be free-flowing in order to feed properly.

Using the apparatus described above, a calcium titanate boule was formed on the pedestal by introducing powdered calcium titanate through the center orifice with 4 liters per minute of oxygen, 5 liters per minute of oxygen through the intermediate orifice and 40 liters per minute of hydrogen through the outermost orifice. The flame temperature was about 1960° C. at the tip of the oxygen cone where the boule was grown.

After the boule reached the size of about 80 carats, the flame was turned off and the boule was heated immediately in a globar type furnace which was previously heated to 1400° C. The boule, therefore, had no chance to cool to a temperature below 1400° C. The type of furnace used is more fully described and claimed in my copending application Serial No. 690,304 filed October 15, 1957. After heat treating the boule in the globar type furnace for about 48 hours, the boule was allowed to cool to room temperature at the rate of 30° C. per hour. This heat treatment annealed the boule so that it would not shatter upon cooling. Upon examination, however, it was found that the annealed boule was slightly twinned and, therefore, it was detwinned by reheating the annealed boule to a temperature between 1650° C. and 1800° C. for 6 hours in a gas fired furnace. After the detwinning operation the boule was then cooled at the rate of 50° C. per hour.

The annealed and detwinned calcium titanate boule possessed a clear, substantially colorless and transparent appearance. By using the process of the instant invention, the calcium titanate boule formed was annealed under such conditions that it was only slightly twinned and that the slightly twinned boule could be detwinned by the subsequent heat treatment. The high temperature annealing operation without any previous cooling of the boule is necessary to prevent the calcium titanate boule from becoming highly twinned. It is necessary to prevent the boule from becoming highly twinned because a highly twinned crystal cannot be detwinned by the subsequent heat treatment.

The detwinned calcium titanate single crystal may be shaped for various purposes such as, for example, blanks suitable for the preparation of lenses, prisms and other optical products, ornamental objects and novelty gems, which depend for the attractiveness and usefulness on the high index of refraction and low reciprocal dispersion.

While this invention has been described and illustrated by the examples shown, it is not intended to be strictly limited thereto, and other modifications and variations may be employed within the scope of the following claims.

I claim:

1. A process for the preparation of a detwinned calcium titanate boule which comprises fusing and crystallizing powdered calcium titanate in an oxyhydrogen flame, said flame having a temperature from 1850° C. to 1950° C., and forming a calcium titanate boule and without cooling said boule to a temperature below 1400° C., heat treating said boule in an oxidizing atmosphere at a temperature from 1400° C. to 1600° C. to anneal said boule, said annealed boule being slightly twinned and heat treating said annealed boule at a temperature of 1650° C. to 1800° C. to detwin said annealed boule, said boule cooled at a rate not exceeding 50° C. per hour at a temperature from 1800° C. to 1000° C.

2. Process according to claim 1 in which said boule is annealed at a temperature of 1400° C. to 1600° C. for 10 hours to 48 hours.

3. Process according to claim 1 in which said annealed boule is detwinned at a temperature from 1650° C. to 1800° C. for 5 hours to 10 hours.

References Cited in the file of this patent

UNITED STATES PATENTS

| | | |
|---|---|---|
| 2,598,707 | Matthias | June 3, 1952 |
| 2,628,156 | Merker | Feb. 10, 1953 |
| 2,685,524 | Merker | Aug. 3, 1954 |
| 2,777,255 | Merker | Jan. 15, 1957 |
| 2,792,287 | Moore | May 14, 1957 |
| 2,799,912 | Greger | July 23, 1957 |